United States Patent
Li et al.

(10) Patent No.: US 7,409,050 B1
(45) Date of Patent: Aug. 5, 2008

(54) METHOD AND APPARATUS FOR MANAGING MISSED-CALL LISTS

(75) Inventors: Jun Li, Lawrence, KS (US); Michael T. Lundy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 413 days.

(21) Appl. No.: 11/111,275

(22) Filed: Apr. 21, 2005

(51) Int. Cl.
*H04M 15/00* (2006.01)
(52) U.S. Cl. ............... 379/142.01; 379/209.01; 379/210.01; 379/142.06
(58) Field of Classification Search ............ 379/209.01, 379/210.01, 376.01, 142.06, 142.07; 455/415, 455/112.01, 418
See application file for complete search history.

(56) References Cited

U.S. PATENT DOCUMENTS

| | | | |
|---|---|---|---|
| 4,682,354 A * | 7/1987 | Vanacore | 379/214.01 |
| 6,381,474 B1 | 4/2002 | Kraft | |
| 6,965,786 B2 * | 11/2005 | Qu et al. | 455/566 |
| 2006/0056606 A1 * | 3/2006 | Bocking et al. | 379/112.01 |

OTHER PUBLICATIONS

Motorola, Profession Radio GP 388—User Guide, Nov. 2001.

\* cited by examiner

*Primary Examiner*—Hai Tran
*Assistant Examiner*—Nafiz E Hoque

(57) ABSTRACT

A method and apparatus for managing a missed-call list in a telephone device by flagging a missed-call entry as "called-back" when a telephone call is placed to or received from the party listed in a missed-call list. The telephone device may still maintain the missed-call in the missed-call list after being flagged. A user may view the missed-call list to see which missed-calls (if any) the user has returned and which missed-call (if any) the user has not returned. Beneficially, the invention enables a user to retain valuable information about a missed-call and is therefore advantageous to the user of a telephone.

20 Claims, 4 Drawing Sheets

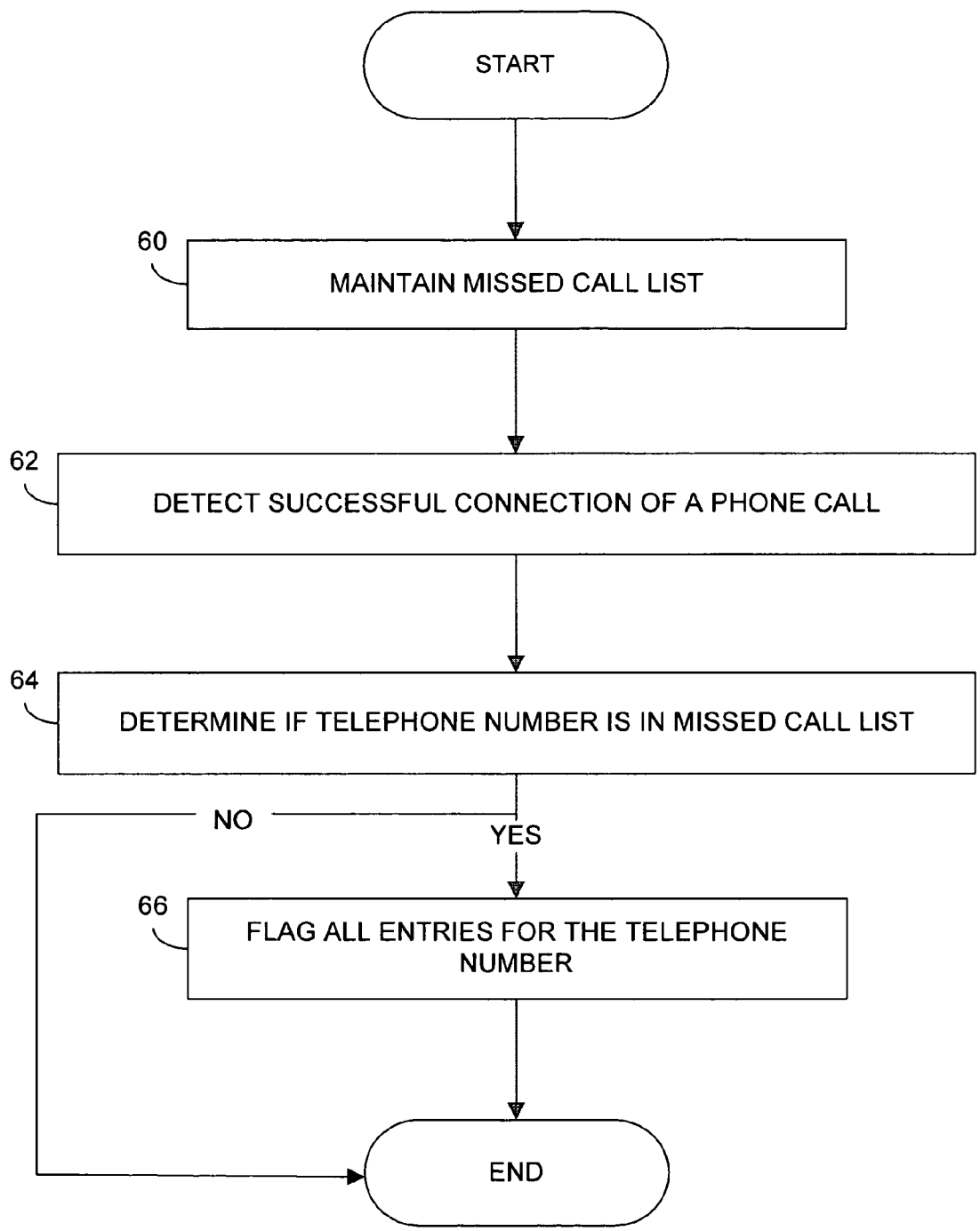

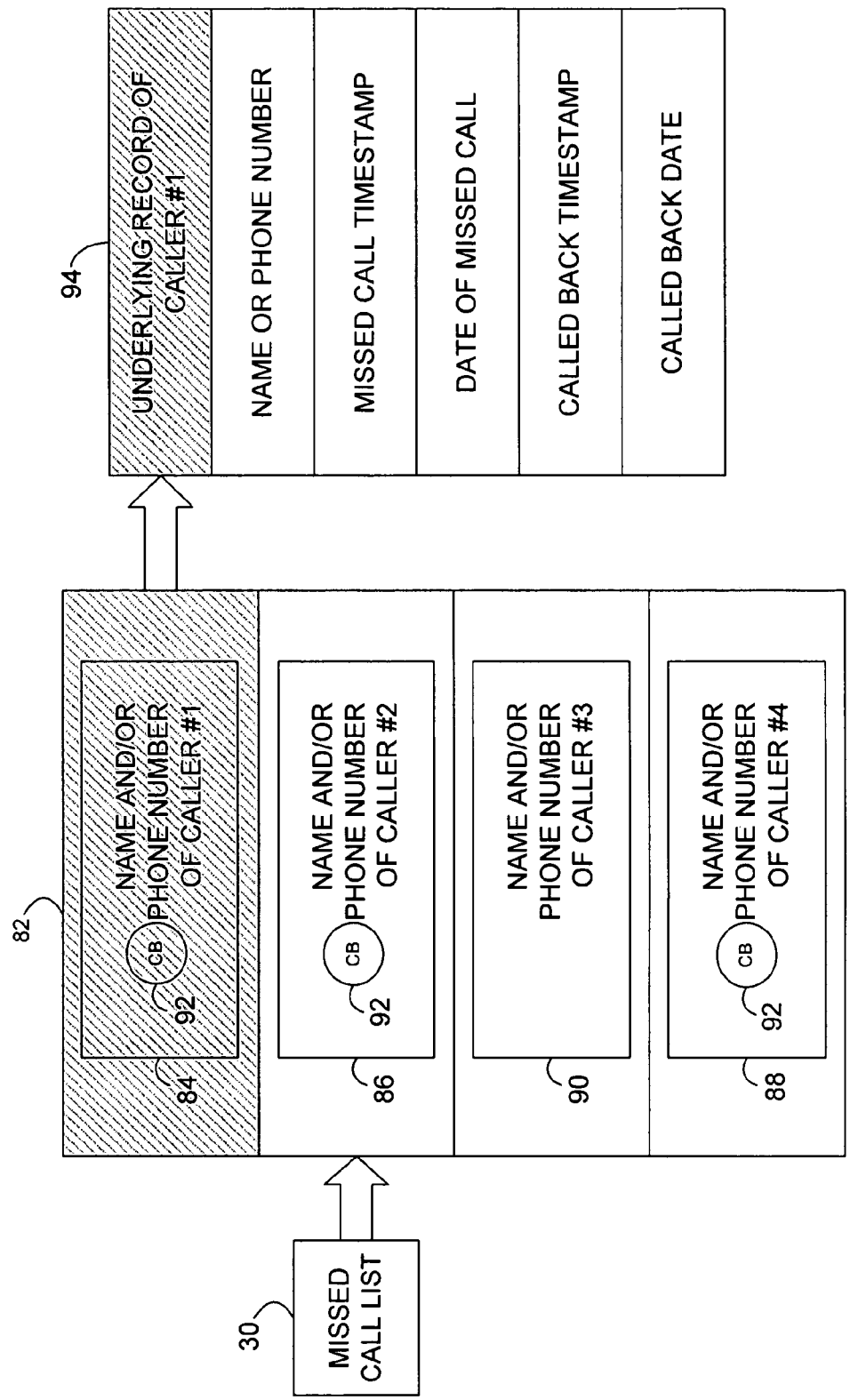

US 7,409,050 B1

METHOD AND APPARATUS FOR MANAGING MISSED-CALL LISTS

FIELD OF THE INVENTION

The present invention relates to telecommunications and, more particularly, to management of missed-call lists.

BACKGROUND

Many telephones today include a "call-log" function that maintains a record of call activity for convenient reference by a user. A typical call-log keeps separate lists of outgoing-calls, answered calls, and missed-calls, with each list specifying for each call a respective telephone number and/or name. In a typical arrangement, the telephone will then provide an on-screen menu through which a user can opt to view a desired list and, in turn, the details regarding a particular call. In most cases, a user can further opt to initiate a call from the call-log, by selecting a listed call and then invoking a call-initiation function.

SUMMARY

The present invention is directed to a method and apparatus for managing a missed-call list. In a preferred embodiment, the invention provides for automatically flagging a missed-call entry as "called-back" when a call is placed to the listed party, but still maintaining the missed-call entry in the missed-call list. When a user views the missed-call list, the user can then conveniently see which missed-calls (if any) the user has returned and which missed-call (if any) the user has not returned.

By keeping a missed-call in the missed-call list while flagging it as a called-back, the invention advantageously preserves a record that the call was missed, which can be valuable information for the user. For instance, the mere presence of a call in the missed-call list tells the user that the calling party intended to contact the user. Further, if entries in the missed-call list indicate the time and date of missed-calls and/or the number of times a particular caller attempted to call, the entries could reflect the level of urgency of particular call attempts. If, instead, a missed-call entry were automatically deleted from the missed-call list upon placement of a call to the listed party, the user would unfortunately lose this and other valuable information.

Consistent with the invention, when a call is placed to a party listed in the missed-call list, an entry for the new call could also be added to an outgoing-call list. That way, the user could then conveniently view a record of the call in the outgoing-call list, and the user could still view a record of the missed-call, flagged as called-back, in the missed-call list.

As a variation, the invention could be arranged more generally to flag a missed-call as "completed" in response to connection of a call either to or from the listed party, again while maintaining the call in the missed-call list. Thus, a missed-call entry could be flagged as completed (e.g., called-back) in response to placement of an outgoing-call to the listed party (e.g., in response to successful connection of a call to the outgoing party, or simply in response to a dialed call to the outgoing party), and a missed-call entry could similarly be flagged as completed in response to successful connection of an incoming-call from the listed party.

These and other aspects, advantages, and alternatives will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

FIG. 3 displays a flow chart of the exemplary functions performed by the present invention in which a flag is placed for a missed-call entry.

FIG. 4 illustrates an example of a flagged missed-call list with a detailed underlying record of a flagged missed-call.

DETAILED DESCRIPTION

A missed-call list may be managed by flagging a missed-call entry as "called-back" when a user places an outgoing-call to a party listed in a missed-call list or when a user responds to an incoming-call from a party listed in a missed-call list.

Figure 1:
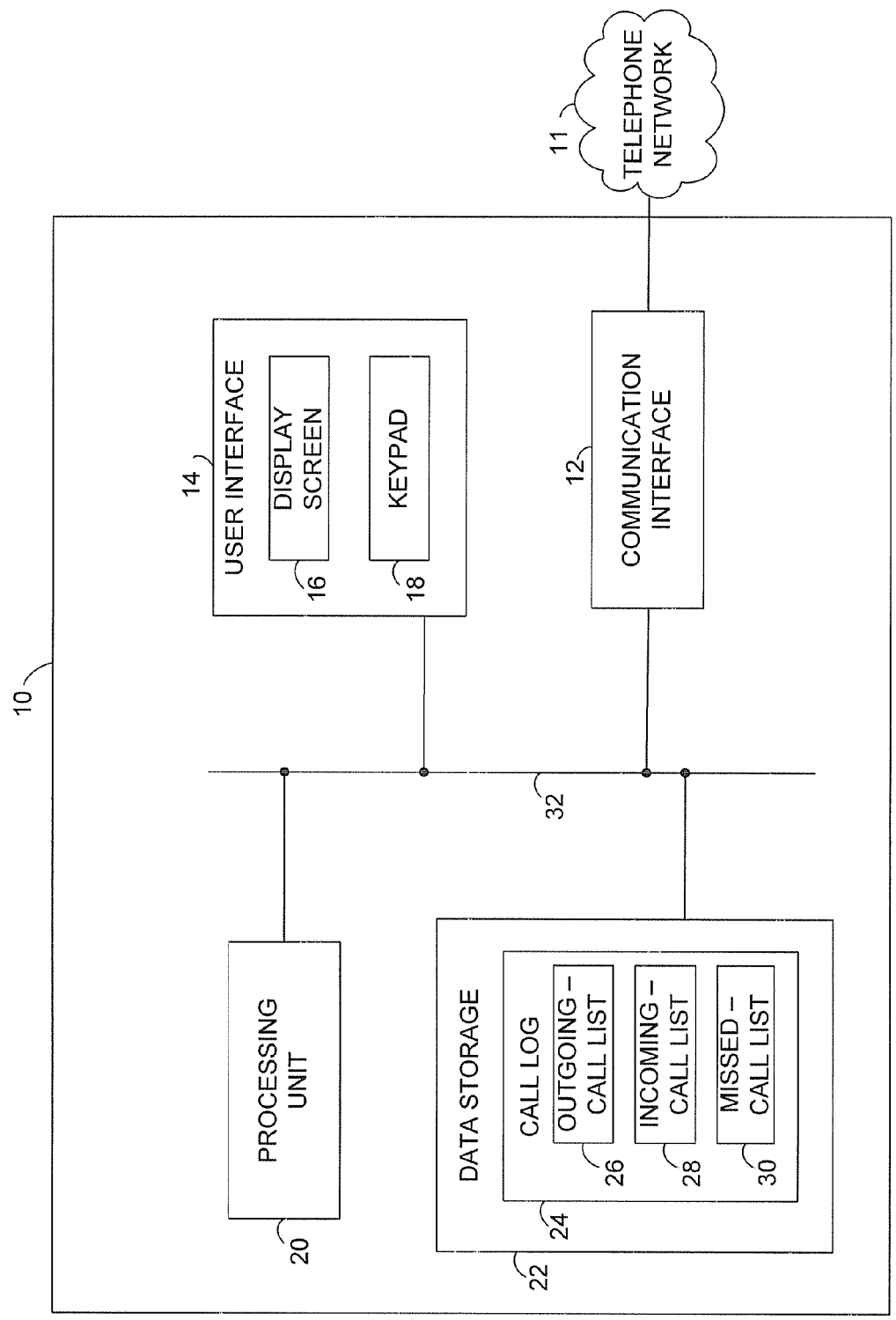
FIG. 1 illustrates a block diagram of a telephone device arranged to carry out an exemplary embodiment of the invention.

FIG. 1 is a simplified block diagram of a telephone device 10 arranged to carry out an exemplary embodiment of the invention. As shown in FIG. 1, the telephone device 10 may be connected with a telephone network 11. The telephone device 10 may include a communication interface 12, a user interface 14, a processing unit 20, and data storage 22. The communication interface 12, user interface 14, processing unit 20, and data storage 22 may be connected by a system bus 32 or other mechanism. The telephone device 10 may include additional components as well or may vary in other ways from the arrangement shown.

The telephone device 10 may be a telephone (e.g., cellular telephone or landline telephone), which a user may use to place and receive calls. The calls may range from voice calls to video calls or may take still other forms.

Alternatively, the telephone device 10 may be an adjunct box (e.g., an enhanced caller-ID display box) that connects with a telephone line but is not equipped to support user communication. The adjunct box may detect incoming or outgoing telephone calls. The adjunct box may also detect when the telephone line is off-hook. Additionally, the adjunct box may maintain a call-log and may include a display for presentation of a call-log. The description below will focus on a telephone; however, the invention may be applied to other types of devices such as an adjunct box, for instance.

The telephone network 11 may support voice and/or video calling and may include circuit switched and/or packet switched components and landline phone and/or wireless components. The telephone network 11 may include a cellular radio network (i.e., a radio network made up of a number of radio cells each served by a fixed transmitter), the Public Switched Telephone Network (i.e., an international telephone network based on copper wires carrying analog voice data), a Voice over Internet Protocol network (i.e., a network using a broadband Internet connection), or any other type of network capable of transmitting calls. It is to be noted that the telephone device 10 is not necessarily coupled with the telephone network 11 but is at least equipped to be coupled with the telephone network 11.

The user interface 14 may include a display screen 16 and a keypad 18. The display screen 16 may be a liquid crystal display screen, but other display screens may also be used. On the keypad 18 are a set of menu keys that provide quick access to the features of a telephone device 10 with just a few key presses of these menu keys. Other forms of a user interface 14 (e.g., touch screens) may be used as well.

The processing unit 20 may include one or more processors, such as a general purpose processor, special purpose processor, and/or a digital signal processor. Other types of processors may also be used.

The data storage 22 may be any medium or media, such as any volatile or non-volatile mass storage system, such as disc, tape storage drive, memory or other storage means readable by the communication interface 12. Further, the data storage 22 may be an add-on module which is temporarily situated within or otherwise connected with the telephone device 10. The data storage 22 may be used to store data and/or machine-readable instructions.

The data storage 22 preferably includes a call-log 24. The call-log 24 is a database or data file that contains details about telephone calls. An exemplary call-log 24 contains an outgoing-call list 26, an incoming-call list 28, or a missed-call list 30. The outgoing-call list 26 contains details about outgoing phone calls placed to others. The incoming-call list 28 contains details about incoming phone calls received from others and answered by the user. The missed-call list 30, on the other hand, contains details about missed calls received from others and unanswered by the user. The call-log may contain additional information as well.

The processing unit 20 may execute logic (e.g., software routine and/or machine code) stored in data storage 22 to control various operating features and functions such as placement of telephone calls, receipt of telephone calls, and management of the call-log 24. Particularly, the processing unit 20 may execute display logic (e.g., software routine and/or machine code to display information) stored in data storage 22 to present an outgoing-call list 26, an incoming-call list 28, or a missed-call list 30 on the display screen 16 in response to a user request.

Additionally, the processing 20 unit may execute logic stored in data storage 22 to delete information contained in the call-log 24. For example, the processing 20 unit may execute logic stored in data storage 22, upon user request, to delete details of missed-calls from the missed-call list 30.

Depending on the type of telephone device 10, the communication interface 12 can take various forms. For instance, if the telephone device 10 is a cellular telephone, the communication interface 12 can include a wireless communication interface, such as a wireless chipset and antenna. As another example, if the telephone device 10 is a landline telephone, the communication interface 12 can include a telephone line interface circuit. Through the chipsets, antennas and/or circuits, the communication interface 12 can send and receive appropriate signals to facilitate placement and receipt of calls.

A user of a telephone device 10 may place and receive phone calls. For example, a user may place an outgoing telephone call and/or receive an incoming telephone call. If the user places an outgoing telephone call, the telephone device 10 places details about the telephone call in the outgoing-call list 26. If the user answers an incoming telephone call, the telephone device 10 characterizes the call as completed and places details about the telephone call in the incoming-call list 28. Otherwise, the telephone device 10 characterizes the telephone call as a missed-call and places details about the telephone call in the missed-call list 30.

A missed-call list 30 may include missed-call entries containing details of missed-calls. The details of a missed-call entry may include (i) a telephone number for the missed-call, (ii) a caller name for the missed-call, (iii) a first timestamp indicating the time of the missed-call, and/or (v) a date of the missed-call. The missed-call entry may also contain a count of the number of call attempts from a caller. In this case, the first timestamp may be replaced by the last call timestamp indicating the time of the last missed-call. The details of a missed-call entry may vary in other ways. For example, any of the above details may be omitted, and/or additional details may be included.

The user interface 14 is preferably used to present information and to receive information. For example, the user interface 14 can present information stored in the call-log 24 upon user request on the display screen 16. Particularly, the user interface can display a missed-call list 30 and details of missed-call entries on the display screen 16 upon user request. The missed-call list 30 may be displayed vertically, horizontally, or in another format. Additionally, the lists may be displayed on the display screen 16 in chronological order (i.e., with the latest phone call displayed first) or in another order.

Figure 2:
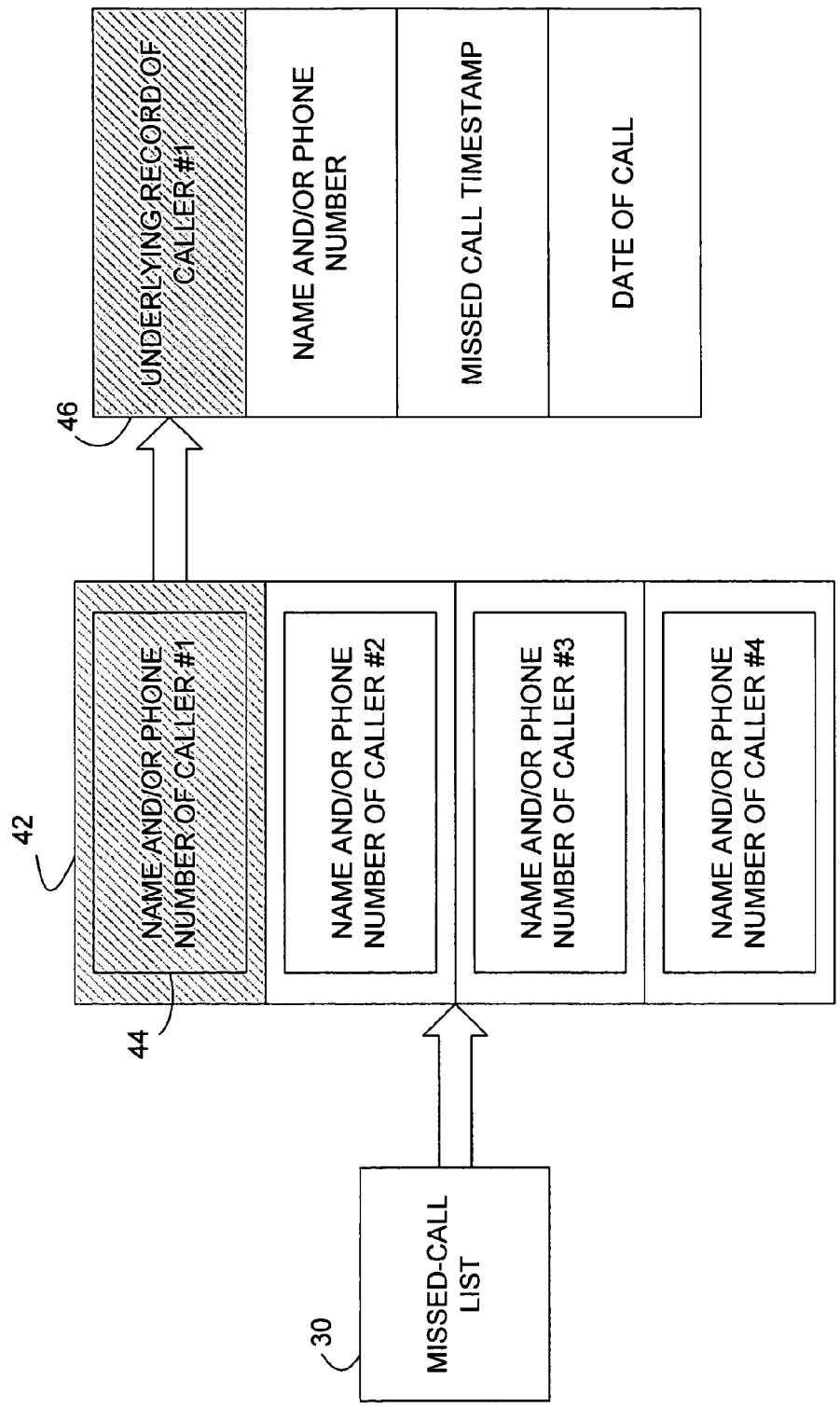
FIG. 2 illustrates an example of a missed-call list with a detailed underlying record of a specific missed-call.

FIG. 2 illustrates an example of a missed-call list 30 which may be shown on the display screen 16 of a cellular telephone, for instance. Block 42 shows four missed-call entries from a missed-call list 30. Each missed-call entry contains a telephone number and/or a name of a caller. Block 46 depicts an underlying data record with details of a missed-call entry 44 of caller number one. The underlying data record 46 contains (i) a telephone number for the missed-call, (ii) a caller name for the missed-call, (iii) a first timestamp indicating the time of the missed-call, and (iv) a date of the missed-call. The above details may be displayed in another order on the display screen 16. Further, any of the above details about a missed-call entry may be omitted from the display screen 16. On the other hand, additional details may be depicted on the display screen 16.

Moreover, a user may optionally view an "Erase" option on the display screen 16 when viewing the call-log 24. The "Erase" option may allow a user to delete information stored in the call-log 24. For example, the "Erase" option may allow a user to delete missed-call entries in the missed-call list 30. Alternatively, the "Erase" option may allow a user to delete the missed-call list 30 in its entirety.

A missed-call may be flagged as "completed" or "called-back" when a user returns a telephone call to a party listed in the missed-call list 30. Alternatively, a missed-call may be flagged as "completed" or "called-back" when a user answers an incoming-call from a party listed in the missed-call list 30. The labels "completed" or "called-back" should not be viewed as limiting. Other labels may be used as well.

FIG. 3 illustrates a set of functions that the telephone device 10 performs in accordance with an exemplary embodiment of the present invention. At block 60, the telephone device 10 maintains the missed-call list 30. The telephone device 10 may maintain the missed-call list 30 by placing details about missed calls in the missed-call list 30.

At block 62, the telephone device 10 detects a successful connection of a telephone call to or from a particular telephone number. The successful connection may occur by placing an outgoing phone call to a particular telephone number of a party listed in the missed-call list 30 even if the outgoing phone call is unanswered by the party. Alternatively, a successful connection may occur by answering an incoming phone call from a particular telephone number of a party listed in the missed-call list 30.

At block 64, the telephone device 10 determines if the particular telephone phone number is present in the missed-call list 30. If the particular telephone number is present in the missed-call list 30, the telephone device 10 flags at least one missed-call entry for the particular telephone number as "called-back" or "completed" at block 66.

The telephone device 10 may flag missed-calls at the time when a user places an outgoing phone call to a telephone number of a party listed in the missed-call list 30 or when a user answers an incoming phone call from a telephone number of a party listed in the missed-call list 30. The telephone device 10 may responsively search for missed-call entries for the telephone phone number and may flag the applicable entries in the missed-call list 30 as depicted in FIG. 3.

Alternatively, the telephone device 10 may flag missed-calls at the time when a user views the missed-call list 30 on the display screen 16. For example, a user may indicate a request to view the missed-call list 30 on the display screen 16. In response to the user request to view the missed-call list 30, the telephone device 10 may compare the missed-call list 30 with both the outgoing-call list 26 and the incoming-call list 28. As a result of the comparison, the telephone device 10 may responsively flag the applicable missed-call entries in the missed-call list 30 according to the depiction in FIG. 3. The telephone device 10 may then show the missed-call list 30 with flagged missed-call entries (if any) on the display screen 16.

A flag may be a stored as a Boolean flag in the data storage 22. The processing unit 20 may execute display logic stored in data storage 22 to display a flagged missed-call entry on the display screen 16.

A flag or other indication can be represented visually on the display screen 16 by an icon and/or text, which can be situated next to a missed-call entry in the missed-call list 30. The choice of an icon versus text may depend on the screen size or other screen and/or memory issues related to the telephone device 10.

A flagged missed-call entry in the missed-call list 30 may include additional details indicating a successful connection of a phone call to and/or from a party listed in the missed-call list 30. The details of a flagged missed-call entry may include (i) a telephone number for the missed-call, (ii) a caller name for the missed-call, (iii) a first timestamp indicating the time of the missed-call, (iv) a date of the missed-call, (v) a second timestamp indicating the time of a successful connection of a telephone call to and/or from a party listed in the missed-call list 30, and/or (vi) a date of a successful connection of a telephone call to and/or from a party listed in the missed-call list 30. The details of a missed-call entry may vary in other ways. For example, any of the above details may be omitted and/or additional details may be included.

FIG. 4 illustrates an example of a missed-call list 30 with flagged missed-call entries which may be shown on a display screen 16 of a cellular telephone, for instance. Block 82 depicts three flagged missed-call entries 84, 86, and 88 and one unflagged missed-call entry 90. Each missed-call entry contains a telephone number and/or a name of a caller.

Flag 92 is a sample flag; other flags with icons and/or texts may be utilized as well. For example, the flag 92 may be a bold-faced missed-call entry, a checkmark, an arrow or any other indication. Additionally, the flag may be situated in locations other that the one shown in block 82. Further, the flag may indicate (e.g., by different icons or other indicia) whether the missed call was returned by an connected incoming call from the number or by an outgoing call placed to the number.

Block 94 depicts an underlying data record with details of a flagged missed-call entry 84 of caller number one. The underlying record contains: (i) a telephone number for the missed-call, (ii) a caller name for the missed-call, (iii) a first timestamp indicating the time of the missed-call, (iv) a date of the missed-call, (v) a second timestamp indicating the time of a successful connection of a telephone call to and/or from a party listed in the missed-call list 30, and (vi) a date of a successful connection of a telephone call to and/or from a party listed in the missed-call list 30. The above details may be displayed in another order on the display screen 16. Further, any of the above details about a missed-call entry may be omitted from the display screen 16. On the other hand, additional details may be depicted on the display screen 16.

Furthermore, the "Erase" option may additionally allow a user to delete flagged missed-calls from the missed-call list 30. The "Erase" option may allow a user to delete (i) selected flagged or unflagged missed-call entries from the missed-call list 30, (ii) all missed-calls entries from the missed-call list 30, or (iii) selected flagged missed-call entries from the missed-call list 30. Other "Erase" options may be provided and utilized as well.

It is to be noted that flagging a missed-call does not remove the flagged missed-call from the missed-call list 30. As a result, a user may still observe the details of the original missed-call, including the timestamp and date.

Further, additional storage space may be required to flag a missed-call entry. However, the cost of storage space is likely to decrease and may offset the cost of any additional storage space needed.

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:
   maintaining in a telephone device a missed-call-log that indicates respectively for each of one or more missed incoming-calls a calling telephone number from which the missed incoming-call was placed;
   the telephone device detecting successful connection of a call to or from a given telephone number and responsively determining if the given telephone number is indicated as a calling telephone number of at least one missed incoming-call in the missed-call log; and
   in response to the telephone device determining that the given telephone number is indicated as a calling telephone number of at least one missed incoming-call in the missed-call log, the telephone device automatically flagging the at least one missed incoming-call as called-back, while maintaining the at least one missed incoming-call in the missed-call log.

2. The method of claim 1, wherein the telephone device is a cellular telephone.

3. The method of claim 1, wherein the telephone device is an adjunct telephone device comprising a display for presentation of the missed-call log.

4. The method of claim 1, further comprising:
   presenting the missed-call log on a display screen for viewing by a user, including on the display screen a visual called-back indication for each missed incoming-call that has been flagged as called-back.

5. The method of claim 4, wherein the visual called-back indication includes a differential flag that indicates whether the missed incoming-call was called back by an outgoing or by an incoming call.

6. The method of claim 4, wherein the visual called-back indication comprises an icon.

7. The method of claim 4, wherein the visual called-back indication comprises text.

8. The method of claim 4, further comprising:
   receiving a user request to present the missed-call log on the display screen, wherein the detecting, determining, flagging, and presenting functions are all performed in response to the user request.

9. The method of claim 4, further comprising:
receiving a user request to present details of a given missed-call-log entry; and
responsively presenting on the display screen for viewing by the user a set of data underlying the given missed-call-log entry, the set of data comprising (i) telephone number, (ii) missed-call timestamp, and (iii) called-back timestamp.

10. The method of claim 1,
wherein maintaining the missed-call log of one or more missed incoming-calls comprises maintaining in data storage an entry respectively for each missed incoming-call, wherein the entry includes data specifying (i) the calling telephone number from which the missed incoming-call was placed and (ii) a first timestamp indicating when the missed incoming-call was received, and
wherein flagging the at least one missed incoming-call as called-back comprises adding a called-back indication to the entry for each of the at least one missed incoming-call.

11. The method of claim 1, further comprising:
receiving a user request to delete from the missed-call log all missed-call-log entries flagged as called-back; and
responsively deleting from the missed-call log all missed incoming-calls that have been flagged as called-back.

12. The method of claim 11, further comprising:
presenting on a display screen a menu that lists as options (i) delete a currently selected missed incoming-call from the missed-call log, (ii) delete all missed incoming-calls from the missed-call log, and (iii) delete all called-back missed incoming-calls from the missed-call log.

13. A method comprising:
maintaining in a telephone device a missed-call log that indicates respectively for each of one or more missed incoming-calls a calling telephone number from which the missed incoming-call was placed;
the telephone device detecting placement of an outgoing-call to a given telephone number and responsively determining if the given telephone number is indicated as a calling telephone number of at least one missed incoming-call in the missed-call log; and
in response to the telephone device determining that the given telephone number is indicated as a calling telephone number of at least one missed incoming-call in the missed-call log, the telephone device automatically flagging the at least one missed incoming-call as called-back, while maintaining the at least one missed incoming-call in the missed-call log.

14. The method of claim 13, wherein detecting placement of an outgoing-call to the given telephone number comprises detecting placement of an outgoing-call from the telephone device to the given telephone number.

15. The method of claim 13,
wherein maintaining the missed-call log of one or more missed incoming-calls comprises maintaining in data storage an entry respectively for each missed incoming-call, wherein the entry includes data specifying (i) the calling telephone number from which the missed incoming-call was placed and (ii) a first timestamp indicating when the missed incoming-call was received,
wherein flagging the at least one missed incoming-call as called-back comprises adding a called-back indication to the entry for each of the at least one missed incoming-call, and
wherein the called-back indication comprises a Boolean flag indicating that the outgoing-call has been placed to the given telephone number.

16. The method of claim 15, wherein the called-back indication comprises a second timestamp indicating when the outgoing-call was placed.

17. A telephone device comprising:
a communication interface arranged to be coupled with a telephone line;
a display screen;
data storage;
a processor;
a missed-call log stored in the data storage, the missed-call log indicating respectively for each of one or more missed incoming-calls a calling telephone number from which the missed incoming-call was placed; and
flagging logic stored in the data storage and executable by the processor to (i) detect placement of an outgoing-call to a given telephone number, (ii) to determine if the given telephone number is indicated as a calling telephone number of at least one missed incoming-call in the missed-call log, and (iii) in response to a determination made by the flagging logic that the given telephone number is indicated as a calling telephone number of at least one missed incoming-call in the missed-call log, flagging the at least one missed incoming-call as called-back while maintaining the at least one missed incoming-call in the missed-call log.

18. The telephone device of claim 17, wherein the telephone device is a cellular telephone.

19. The telephone device of claim 17, further comprising display logic stored in the data storage and executable by the processor to present the missed-call log on the display screen for viewing by a user, including on the display screen a visual called-back indication for each missed incoming-call that has been flagged as called-back.

20. The telephone device of claim 19, wherein the visual called-back indication comprises an element selected from the group consisting of an icon and text.

* * * * *